United States Patent Office 3,465,045
Patented Sept. 2, 1969

3,465,045
FLUORINATED VINYL ETHERS AND USE THEREOF
Allen G. Pittman, El Cerrito, and William L. Wasley, Berkeley, Calif., assignors to the United States of America as represented by the Secretary of Agriculture
No Drawing. Filed May 20, 1965, Ser. No. 457,533
Int. Cl. C07c 41/00; C08f 3/38; B32b 27/30
U.S. Cl. 260—614                                4 Claims

ABSTRACT OF THE DISCLOSURE

Fluorinated vinyl ethers are prepared by first reacting a ketone with an alkali metal fluoride to produce an alkali metal fluorocarbinolate, then with a dihaloethane to form an α-fluorinated ether, and then dehydrohalogenating the intermediate to produce the α-fluorinated vinyl ether. The process can be carried out with open- or closed-chain aliphatic ketone which contains at least two fluorine atoms on the carbons adjacent the carbonyl group of the ketone. Homo- and copolymers prepared from the fluorinated vinyl ethers are useful as adhesives and for providing oil- and water-repellent coatings on a large variety of substrates.

---

A non-exclusive, irrevocable, royalty-free license in the invention herein described, throughout the world for all purposes of the United States Government, with the power to grant sublicenses for such purposes, is hereby granted to the Government of the United States of America.

This inventon relates to and has among its objects the provision of novel processes for preparing fluorinated compounds, particularly fluorinated vinyl ethers and polymers thereof; the provision of the compounds as new compositions of matter; and procedures for treating fibrous materials, especially textiles, with the compounds. Further objects of the invention will be evident from the following description wherein parts and percentages are by weight unless otherwise specified.

In conventional practice if it is desired to convert a ketone into a vinyl ether, the following procedure is used: The ketone is reduced to an alcohol and the alcohol is then etherified by reaction with acetylene. Thus

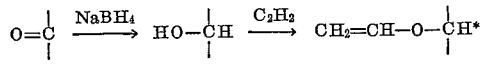

It is to be particularly observed that the conventional procedure requires a reduction step and that the ether product contains a hydrogen atom on the alpha position of the alcohol residue. (This hydrogen atom is indicated above by the asterisk.)

In accordance with the invention, fluorinated vinyl ethers are prepared from ketones, as follows:

In a preliminary step (described and claimed in our co-pending application Ser. No. 398,129 filed Sept. 21, 1964), now Patent 3,384,628 the ketone is reacted with an alkali metal fluoride to convert the carbonyl radical of the ketone into an alkali metal fluorocarbinolate radical, that is, a fluorocarbinol group wherein the hydrogen of the hydroxyl radical is replaced by alkali metal. Thus:

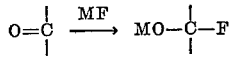

In the above formula M stands for an alkali metal.

In the first step in accordance with the present invention, the fluorocarbinolate intermediate is reacted with a dihaloethane—for example, 1,2-dibromoethane—to form an ether, as follows:

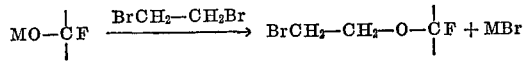

In the second step, the above haloethyl ether intermediate is dehydrohalogenated—for example, by contacting it with alcoholic KOH—to give the vinyl ether. Thus:

By this simple synthesis, many different kinds of fluorinated vinyl ethers can be prepared in high yields.

It is evident from the above formulas that the synthesis converts the ketone function to an ether function without requiring the use of a reducing agent and concomitantly a fluorine group is added, that is, the vinyl ether contains a fluorine group on the alpha carbon atom of the alcohol moiety. This is an unusual and heretofore unknown type of structure which gives the products especially useful properties. For example, the products can be used to provide oil-, water-, and soil-repellent finishes on textiles and the repellency attained is substantially greater than that achieved with the corresponding compounds wherein the same position is occupied by hydrogen.

The process of the invention is by no means limited to the example above but is of great versatility and, generically, can be applied to any aliphatic (open-chain or closed-chain) ketone which contains at least two fluorine groups adjacent to the carbonyl group. In other words, the carbon atoms connected to the carbonyl group must contain at least two fluorine atoms—distributed on these carbon atoms symmetrically or asymmetrically. These fluorine groups are a critical item to activate the carbonyl group so that it will undergo the desired transformation when contacted with the alkali metal fluoride. Especially good results are obtained when the carbon atoms adjacent to the carbonyl radical contain halogen radicals (i.e., F, Cl, Br, or I) in addition to the minimum of two fluorine groups. In this connection it may be noted that although halogens of higher atomic weight than fluorine—i.e., Cl, Br, and I— are not effective by themselves to activate the carbonyl group, they can be employed to supplement the activating influence of fluorine groups. Beyond the positions adjacent to the carbonyl group, the structure of the ketone is of no criticality to the process and available sites may be occupied, for example, by hydrogen or halogen. In other words, the critical item for the process aspect of this invention is that the starting compound contain a carbonyl group activated by adjacent fluorine atoms as explained hereinabove; the remainder of the starting compound is not material to the process. Of course, this remainder may be limited in accordance with certain parameters to provide particular desired characteristics in the vinyl ether products. However, such limitation concerns the character of the vinyl ether product, not the operation of the process.

Typical examples of ketones to which the process of the invention may be applied and the corresponding ether products are given below by way of illustration but not limitation.

| Ketone (starting compound) | Vinyl ether (product) |
|---|---|
| $CF_3-(CF_2)_n-\overset{O}{\underset{\|}{C}}-(CF_2)_{n'}-CF_3$ | $CF_3-(CF_2)_n-\underset{\|}{\overset{Vinyl-O}{C}}-(CF_2)_{n'}-CF_3$ |
| | $\phantom{CF_3-(CF_2)_n-}\underset{F}{\phantom{C}}$ |

Wherein $n$ and $n'$ are each a number from 0 to 10

| Ketone (starting compound) | Vinyl ether (product) |
|---|---|
| $(CF_3)_2CF-\overset{O}{\overset{\|}{C}}-CF(CF_3)_2$ | $(CF_3)_2CF-\overset{Vinyl-O}{\overset{\|}{C}}-CF(CF_3)_2$ |
| | $\phantom{xx}F$ |
| $CF_3-(CF_2)_n-\overset{O}{\overset{\|}{C}}-CF(CF_3)_2$ | $CF_3-(CF_2)_n-\overset{Vinyl-O}{\overset{\|}{C}}-CF(CF_3)_2$ |
| | $\phantom{xx}F$ |

Wherein n is a number from 0 to 18

| $R-\overset{O}{\overset{\|}{C}}-CF(CF_3)_2$ | $R-\overset{Vinyl-O}{\overset{\|}{C}}-CF(CF_3)_2$ |
|---|---|
| | $\phantom{xx}F$ |

Wherein R represents the heptafluorocyclobutyl radical $O=\overset{\frown}{C}\phantom{x}(CF_2)_n$      $Vinyl-O-\overset{\frown}{C}-F\phantom{x}(CF_2)_n$ Wherein n is a number from 3 to 10

COMPOUNDS CONTAINING OTHER HALOGEN ATOMS IN ADDITION TO FLUORINE (Y is Cl, Br, or I)

| Ketone | Vinyl ether |
|---|---|
| $YCF_2-\overset{O}{\overset{\|}{C}}-CF_3$ | $YCF_2-\overset{Vinyl-O}{\overset{\|}{C}}-CF_3$ |
| $YCF_2-\overset{O}{\overset{\|}{C}}-CF_2Y$ | $YCF_2-\overset{Vinyl-O}{\overset{\|}{C}}-CF_2Y$ |
| $Y_2CF-\overset{O}{\overset{\|}{C}}-CF_2Y$ | $Y_2CF-\overset{Vinyl-O}{\overset{\|}{C}}-CF_2Y$ |
| $Y_2CF-\overset{O}{\overset{\|}{C}}-CFY_2$ | $Y_2CF-\overset{Vinyl-O}{\overset{\|}{C}}-CFY_2$ |
| $CF_3-(CF_2)_n-\overset{O}{\overset{\|}{C}}-CF_2Y$ | $CF_3-(CF_2)_n-\overset{Vinyl-O}{\overset{\|}{C}}-CF_2Y$ |

Wherein n is a number from 0 to 18

| $CF_3-(CF_2)_n-\overset{O}{\overset{\|}{C}}-CFY_2$ | $CF_3-(CF_2)_n-\overset{Vinyl-O}{\overset{\|}{C}}-CFY_2$ |
|---|---|

Wherein n is a number from 0 to 18

COMPOUNDS CONTAINING HYDROGEN IN ADDITION TO FLUORINE (n and n' are each a number from 1 to 18)

| Ketone | Vinyl ether |
|---|---|
| $H(CF_2)_n-\overset{O}{\overset{\|}{C}}-(CF_2)_{n'}H$ | $H(CF_2)_n-\overset{Vinyl-O}{\overset{\|}{C}}-(CF_2)_{n'}H$ |
| $H(CF_2)_n-\overset{O}{\overset{\|}{C}}-(CF_2)_{n'}F$ | $H(CF_2)_n-\overset{Vinyl-O}{\overset{\|}{C}}-(CF_2)_{n'}F$ |
| $H(CF_2)_n-\overset{O}{\overset{\|}{C}}-CF(CF_3)_2$ | $H(CF_2)_n-\overset{Vinyl-O}{\overset{\|}{C}}-CF(CF_3)_2$ |
| $R-\overset{O}{\overset{\|}{C}}-C_nF_{2n+1}$ | $R-\overset{Vinyl-O}{\overset{\|}{C}}-C_nF_{2n+1}$ |

Wherein R represents an alkyl group containing 1 to 18 carbon atoms or a cycloalkyl group such as cyclopropyl, cyclobutyl, or cyclohexyl Generically, a preferred class of ketones which may be used in the process of the invention and the intermediates and the vinyl ethers formed therefrom may be represented by the following structures:

| (A) Ketone | (B) Alkali metal fluorocarbinolate | (C) Ether intermediate | (D) Vinyl ether |
|---|---|---|---|
| $R-\overset{R}{\overset{\|}{C}}-R$ <br> $O=C$ <br> $R-\overset{R}{\underset{\|}{C}}-R$ | $R-\overset{R}{\overset{\|}{C}}R$ <br> $MO-CF$ <br> $R-\overset{R}{\underset{\|}{C}}-R$ | $R-\overset{R}{\overset{\|}{C}}-R$ <br> $ZCH_2-CH-O-CF$ <br> $R-\overset{R}{\underset{\|}{C}}-R$ | $R-\overset{R}{\overset{\|}{C}}-R$ <br> $CH_2=CH-O-CF$ <br> $R-\overset{R}{\underset{\|}{C}}-R$ |

Wherein each R represents a member of the group consisting of hydrogen, halogen, alkyl, haloalkyl, cycloalkyl, and halocycloalkyl and wherein at least two of the R's are fluorine. M represents an alkali metal. In formula C, one Z is hydrogen, the other Z is a halogen, such as chlorine, bromine, or iodine.

The ethers responding to the above structures C and D are new compounds, not heretofore prepared or described.

Particularly preferred for treating fibrous materials, e.g., textiles, are the vinyl ethers of the structure shown below and the polymers derived from these ethers:

$$Vinyl-O-\overset{CF_3}{\underset{CF_3}{\overset{\|}{C}F}}$$

$$Vinyl-O-\overset{CF_2Cl}{\underset{CF_3}{\overset{\|}{C}F}}$$

$$Vinyl-O-\overset{CF_2Cl}{\underset{CF_2Cl}{\overset{\|}{C}F}}$$

As noted above, in a preliminary step of the synthesis the fluoroketone is reacted with an alkali metal fluoride. As the latter reagent, potassium fluoride is generally preferred, but the fluorides of sodium, cesium, and rubidium may also be used. The reaction is generally conducted in an inert solvent for the ketone, for example, acetonitrile, dioxane, tetrahydrofuran, tetramethylene sulphone, diglyme (an abbreviated name for dimethyl ether of diethylene glycol), etc. The alkali metal fluoride is only slightly soluble in these solvents and the disappearance of undispersed alkali metal fluoride during the reaction supplies a useful indication of formation of the desired fluorocarbinolate intermediate (which is soluble). The temperature of reaction is not critical. Generally, temperatures over 35° C. are avoided to prevent decomposition of the intermediate. Usually, the reaction is conducted at room temperature for convenience but it does take place at much lower temperatures. Where the starting ketone is a gas (for example, hexafluoroacetone) it is preferred to cool the system first to get the ketone into solution. Then, the temperature can be increased—for example, allowed to warm to room temperature—to accelerate the reaction. To prevent hydrolysis of the intermediate, the reaction is conducted under anhydrous conditions. It is also helpful to remove air (which may contain moisture) by flushing the reaction vessel with dry, inert gas such as nitrogen. When the intermediate is formed—as evidenced by disappearance of undissolved alkali metal fluoride—the system is ready for further treatment. Generally, the intermediate is not isolated but is employed just as it is formed.

Having thus prepared the fluorocarbinolate intermediate, etherification is accomplished by simply adding a dihaloethane to the reaction system containing the said intermediate and applying stirring. The temperature at which the etherification is conducted is not a critical factor and may vary, for example, from 20 to 100° C. Generally, the higher temperatures in this range, namely about 50 to 100° C., are preferred to increase the rate of reaction. The dihaloethane reactant may contain the halogen atoms (chlorine, bromine, or iodine) in the 1,1 or 1,2 positions. Generally, the 1,2-substituted derivatives are preferred. Examples of such reagents are 1,2-dibromoethane; 1-bromo-2-chloroethane; 1,2-dichloroethane; 1-bromo-2-iodoethane; 1-chloro-2-iodoethane; and the like.

The haloethyl ether may be recovered from the reaction system in the following manner: The precipitated inorganic halide (for example, potassium bromide where the reactants are 1,2-dibromoethane and a potassium fluorocarbinolate) is removed and water is added to the reaction mixture. The organic phase containing the haloethyl ether is removed from the aqueous phase and is then dried and the product used directly in the dehydrohalogenation step or first purified by distillation. In the alternative, the reaction mixture may be filtered to remove the alkali metal salt and the haloethyl ether isolated by distillation.

In the next step, the haloethyl ether is dehydrohalogenated to form the vinyl ether. This step may be accomplished by any of the usual techniques of dehydrohalogenation. Typical examples of suitable procedures are: Refluxing with excess methanolic KOH; heating at about 150–160° with a teriary amine such as guinoline, pyridine, or N-dimethylaniline; heating at about 150° C. with mineral oil in which powdered NaOH or KOH is suspended. The vinyl ether may be recovered from the reaction system by distillation at atmospheric pressure or under vacuum.

The vinyl ethers produced in accordance with the invention may be used in many areas wherein vinyl compounds in general are employed, e.g., as intermediates in reactions involving the double bond. Moreover, the vinyl ethers are polymerizable and can be formed into homopolymers or copolymers by standard techniques, using ionic or free radical catalysts employed in the polymerization of known vinyl ether monomers. Homopolymers can be produced, for example, by mixing the vinyl ether with a catalytic quantity of a free radical generator such as benzoyl peroxide or lauryl peroxide and heating the mixture at about 60–120° C. Copolymers can be produced by applying the same procedure to a mixture of the vinyl ether plus a different vinyl monomer such as styrene, vinyl chloride, vinyl acetate, vinylidene fluoride, methyl or ethyl acrylate, methyl or ethyl methacrylate, acrylamide, acrylonitrile, or the like. The polymers of the invention are useful where increased thermal stability and solvent resistance are required. Thus, they can be employed in such applications as coating and as adhesives in laminating sheet material where conventional polymers are unsuitable because of solubility in common organic solvents.

A particular phase of the present invention is concerned with the treatment of fibrous materials, such as textiles, in order to improve their properties, e.g., to improve their oil-, water-, and soil-repellency. In practicing this phase of the invention, a vinyl ether polymer is prepared as hereinabove described and applied to the fibrous material. The polymer may be a homopolymer, that is, one consisting of recurring units of the vinyl ether, or it may be a copolymer, that is, a polymer containing recurring units of the vinyl ether interspersed with units derived from a different vinyl monomer, such as styrene, ethyl methacrylate, acrylonitrile, ethylene, propylene, vinylidene fluoride, and the like. The polymers (homo- or co-polymers) are applied to the fibrous material in conventional manner. Typically, the polymer is dissolved in an inert, volatile solvent—for example, benzotrifluoride or 1,3-bis-trifluoromethyl benzene—and the resulting solution applied to the fibrous material by a conventional dip and pad technique. By varying the concentration of polymer in solution and the degree of padding, the amount of polymer deposited on the material may be varied. Typically, the amount of polymer may be about from 0.1 to 20%, based on the weight of fibrous material but it is obvious that higher or lower proportions can be used if desired. Usually, in treating textiles such as fabrics the amount of polymer is limited to about 0.1 to 10% to attain the desired repellency improvement without interference with the hand of the textile. Generally, it is preferred to subject the fibrous material to a conventional curing operation after application of the polymer solution thereto in order to bond the polymer to the fibers. As an example of such treatment, the fibrous material is heated in the range of about 50 to 150° C. for a period of about 5 to 30 minutes. The solvent (from the polymer solution) may be evaporated in a separate step prior to curing or may be simply evaporated during the curing operation. In an alternative procedure, the polymers are applied to the fibrous material in the form of an aqueous emulsion, then curing is applied. Fibrous materials treated with the polymers of the invention display an increased resistance to becoming soiled because they repel both water- and oil-borne soils and stains. Moreover, the improvements so rendered are durable—they are retained despite laundering and dry-cleaning of the product. In an alternative procedure, they vinyl ether in monomeric form is applied to the fibrous substrate and the resulting material subjected to high-energy ionizing radiation to cause the monomer to polymerize in situ on the fibrous substrate.

The invention may be utilized for improving the properties of all types of fibrous materials, for example, paper; cotton; linen; hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg albumin, collagen, or keratins; nylon; polyurethane fibers; polyester fibers such as polyethylene terephthalate; polyacrylonitrile-based fibers; or fibers of inorganic origin such as asbestos, glass, etc. The invention may be applied to textile materials which are in the form of bulk fibers, filaments, yarns, threads, slivers, roving, top, webbing, cord, tape woven or knitted fabrics felts or other non-woven fabrics garments or garment parts.

EXAMPLES

The invention is further demonstrated by the following illustrative examples. The various tests described in the examples were carried out as described below:

Oil repellency: The 3M repellency test described by Crajack and Petersen, Textile Research Journal 32, pages 320–331, 1962. Ratings are from 0 to 150, with the higher values signifying the greater resistance to oil penetration.

Water repellency: AATC spray test, method 22–1952. Ratings are from 0 to 100, with the higher values signifying greater resistance to water penetration.

Example I.—Preparation of 1-bromo-2-heptafluoroisopropoxyethane

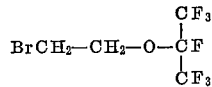

A dry 500-ml. 3-neck flask was equipped with stirring bar and Dry-Ice reflux condenser and then charged with 31.8 g. KF (0.54 mole) and 250 ml. diglyme (the dimethyl ether of diethylene glycol). The flask was then cooled in a Dry-Ice acetone bath and 90 gm. (0.54 mole) hexafluoroacetone introduced. The contents of the flask was stirred and allowed to come to room temperature as the formation of potassium heptafluoroisopropyl alcoholate took place. After approximately 1-hour the alcoholate formation was complete, as evidenced by the disappearance of dispersed KF, and a clear solution was obtained. One-hundred and fifty grams (0.8 mole) of 1,2-dibromoethane was then added, in one batch, to the contents of the flask. The Dry-Ice condenser was replaced with a water-cooled condenser and the flask was heated at 75° C. for 6 hours. As the reaction progressed, KBr precipitated out of solution. The reaction mixture was poured into 3 volumes of sold water and the lower fluorocarbon layer collected. This fluorocarbon layer (169 g.) was washed twice with water and dried. It was analyzed with a gas chromatographic unit and found to contain ca. 33% of the desired monoaddition product and approximately 8% of the diaddition product and unreacted starting material. The monoaddition product (1 - bromo - 2 - heptafluoroisopropoxyethane) was separated by fractional distillation 30% yield, B.P. 103° C. at 760 mm.; $N_D^{23}$ 1.3360.

*Analysis.*—Calcd. for $C_5H_4F_7OBr$: C, 20.47; H, 1.37; F, 45.39. Found: C, 21.02; H, 1.50; F, 45.2.

The proton and fluorine nuclear magnetic resonance spectra were in accord with the proposed structure.

Example II.—Preparation of 1-chloro-2-heptafluoroisopropoxyethane

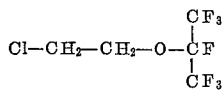

This compound was prepared in a manner similar to the procedure described in Example I using the following materials:

| | |
|---|---|
| Hexafluoroacetone (0.17 mole) _____g__ | 28 |
| KF (0.17 mole) _____g__ | 10 |
| Diglyme _____ml__ | 90 |
| 1-bromo-2-chloroethane (0.17 mole) _____g__ | 24.3 |

Thirty-five g. of crude product was obtained which contained 60% of the desired product and 40% unreacted starting material. The product was purified by distillation, 50% yield, B.P. 93° C. at 760 mm.; $N_D^{23}$ 1.3139.

*Analysis.*—Calcd. for $C_5H_4F_7OCl$: C, 24.19; H, 1.61; F. 53.62; Cl, 14.11. Found: C, 24.35; H, 1.90; F, 54.7; Cl, 13.7.

The infrared and NMR spectra were in accordance with the proposed structure.

Example III.—Preparation of heptafluoroisopropyl vinyl ether

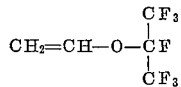

In a 3-neck, 100-ml. dry round-bottom flask, equipped with a condenser, stirring bar and thermometer, was placed 30 ml. methanol and 15 g. KOH. The mixture was stirred and heated to 90–100° C. Then 10 g. of 1-bromo-2-heptafluoroisopropoxyethane was added over a period of 15 minutes. During the addition, the condenser water was shut off and the condenser was allowed to warm to 40–50° C. to allow for removal of product. The mixture was heated an additional 20 minutes after the addition of the bromo-fluoro-ethane had been completed. The product (6.8 g.) was collected in a Dry-Ice trap which was connected to the outlet of the condenser. Distillation of the crude product gave 4 g. of pure vinyl ether, B.P. 29° C. at 760 mm. The infrared spectra was in accordance with the vinyl ether structure. The vinyl absorption occurred at 6.0 microns which is at a slightly lower wavelength than for normal vinyl compounds (e.g., vinyl bromide absorption occurs at 6.15–6.25 microns). This lowered absorption is expected owing to the electro-negativity of the fluoroalkoxy group.

Example IV.—Preparation of 1,3-dichloropentafluoroisopropyl vinyl ether

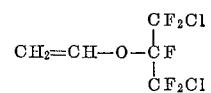

1-bromo - 2 - (1,3-dichloropentafluoroisopropoxy)ethane was prepared in a manner similar to that described in Example I using equimolar quantities of 1,2-dibromoethane, potassium fluoride, 1,3-dichlorotetrafluoroacetone (i.e., $ClF_2C-CO-CF_2Cl$), and digylme as a solvent. Gas chromatographic analysis of the crude product indicated a 60% conversion to the desired 1-bromo-2-(1,3-dichloropentafluoroisopropoxy)ethane:

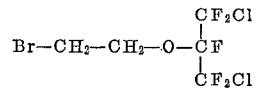

The crude mixture was added dropwise to a hot (100–110° C.) solution of KOH in ethanol (approximately 0.5 g. KOH/ml. ethanol) and the vinyl ether product distilled from the flask during the course of the addition. The product was poured into an equal volume of water in order to remove ethanol. The fluorocarbon layer was dried and distilled, B.P. 81° C./760 mm.; $N_D^{23}$ 1.3579.

*Analysis.*—Calcd. for $C_5F_5Cl_4H_2O$: C, 24.58; F, 38.93; H, 1.2. Found: C, 24.61; F, 38.5; H, 1.0.

Infrared analysis showed the expected absorptions for C—F, C—Cl, C—H and C—O—, with the $CH_2=CH$- absorption at 6.05 microns.

Example V.—Preparation of 1-chlorohexafluoroisopropyl vinyl ether

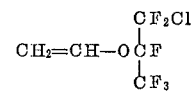

1-chloro - 2 - (1-chlorohexafluoroisopropoxy)ethane was prepared in a manner similar to that described in Example I using equimolar quantities of 1-bromo-2-chloroethane, monochloropentafluoroacetone, KF, and diglyme as solvent. The crude product was dehydrochlorinated directly without preliminary purification using hot alcoholic KOH as described in Example IV. The vinyl ether was purified by distillation, B.P. 53–55° C.

Example VI.—Polymerization of heptafluoroisopropyl vinyl ether

A 5″, 7-mm. O.D., Pyrex tube, sealed at one end, was charged with 50 mg. $\alpha,\alpha'$-azobisisobutyronitrile. The tube was attached to a manifold system, evacuated and cooled in Dry-Ice acetone. Approximately 0.5 ml. heptafluoroisopropyl vinyl ether was added to the tube and the upper end of the Pyrex tube was then melt sealed. The tube was placed in an autoclave and heated at 80° C. for 5 hr. At the end of this time, the tube was opened and approximately 210 mg. (30% conversion) of a light brown, solid, brittle polymer was obtained. The polymer readily dissolved in fluorinated solvents such as dichlorotetrafluoroethane. Analysis: 62% fluorine.

Example VII.—Application of poly(heptafluoroisopropyl vinyl ether) to wool cloth A 5% solution of poly(heptafluoroisopropyl vinyl ether) in dichlorotetrafluoroethane was prepared. Wool swatches were wetted out with the polymer solution to a 100% wet pick-up. The swatches were then heated at 110° for 15 minutes.

The treated swatches gave oil-repellency ratings of 90 and water-repellency ratings of 100. Untreated control samples gave an oil-repellency rating of 0 and a water-repellency rating of 50–60.

Example VIII.—Application of poly(1-chlorohexafluoroisopropyl vinyl ether) to wool cloth 1-chlorohexafluoroisopropyl vinyl ether, prepared as described in Example V, was polymerized in the manner detailed in Example VI.

A 5% solution of the polymer in dichlorotetrafluoroethane was prepared. Wool swatches were immersed in the polymer solution and subsequently heated at 110° for 15 min. The treated wool swatches exhibited oil-repellency ratings of 70–80 (compared to untreated, 0 rating) and water-repellency ratings of 100 (compared to untreated, 50–60 rating).

Example IX.—Copolymerization of heptafluoroisopropyl vinyl ether and ethyl methacrylate Equal weights of ethyl methacrylate and heptafluoroisopropyl vinyl ether were heated together with 1% of α,α'-azobisisobutyronitrile in a sealed tube at 80° C. for 5 hours. A hard solid polymer was obtained in 40% conversion. Fluorine analysis of the polymer revealed a 10% content.

Having thus described the invention, what is claimed is:

1. A vinyl ether of the structure:

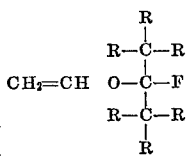

wherein each R is a member of the group consisting of hydrogen, halogen, alkyl, haloalkyl, cycloalkyl, and halocycloalkyl, and wherein at least two of the R's are fluorine.

2. A vinyl ether of the structure:

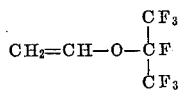

3. A vinyl ether of the structure:

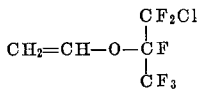

4. A vinyl ether of the structure:

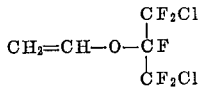

References Cited

UNITED STATES PATENTS

| | | |
|---|---|---|
| 2,336,921 | 12/1943 | Benning et al. |
| 2,452,944 | 11/1948 | McBee et al. |
| 2,574,649 | 11/1951 | McBee et al. |
| 2,732,370 | 1/1956 | Codding. |
| 2,749,369 | 6/1956 | Lyon et al. |
| 3,062,299 | 11/1962 | Tarrant et al. |
| 3,162,622 | 12/1964 | Aldrich. |

OTHER REFERENCES

Hene et al.: Jour. Amer. Chem. Soc., 72 (1950), pp. 4378–4380.

LEON ZITVER, Primary Examiner

HOWARD T. MARS, Assistant Examiner

U.S. Cl. X.R.

106—2, 287; 117—139.5, 135.5, 155, 126, 143, 145; 252—8.9; 260—91.1, 611, 615